June 17, 1958  J. W. GRAY  2,839,747
NAVIGATIONAL FIX COMPUTER
Filed June 30, 1948  3 Sheets-Sheet 2

INVENTOR
JOHN W. GRAY
BY
ATTORNEY

June 17, 1958

J. W. GRAY 2,839,747

NAVIGATIONAL FIX COMPUTER

Filed June 30, 1948

INVENTOR
JOHN W. GRAY
BY
ATTORNEY

United States Patent Office 2,839,747
Patented June 17, 1958

2,839,747
NAVIGATIONAL FIX COMPUTER

John W. Gray, White Plains, N. Y., assignor to General Precision Laboratory Incorporated, a corporation of New York Application June 30, 1948, Serial No. 36,214

8 Claims. (Cl. 343—7)

This invention relates to a navigational fix computer whereby periodic corrections of any cumulative errors may be made in navigational systems of the type which continuously display the present latitude and longitude of the vehicle on which the system is carried.

A navigational system which provides a continuous indication of the latitude and longitude of a vehicle is disclosed in the copending application of Tull and Gillette, Serial No. 749,184, filed May 20, 1947, and assigned to the same assignee and this invention is in the nature of added implementation thereto, whereby errors in indication of latitude and longitude may be corrected as the occasion arises.

In any system such as disclosed in the aforementioned application certain errors of operation are bound to occur. Even where such errors are quite small, say on the order of 1 percent or less, nevertheless on a long continuous trip, such as a long airplane flight the errors will accumulate in the course of time so that eventually the reading of present latitude and longitude as obtained by the navigational system will depart from the true latitude and longitude of the vehicle.

Where, however, recognizable objects of known position lie along the path of expected travel it becomes possible to check the position as indicated on the vehicle with the exact known position of the recognizable object. Of course, position might be checked by flying directly over the known position object if the apparatus is used in aircraft, the present position as indicated on the airplane being checked at the instant of passage over the known point and correction entered at that time if found necessary. The conditions which might permit of such a maneuver, however, are of infrequent occurrence and are often impractical.

Where a radar display, say of the plan-position indicator type, is carried by the vehicle, observations as to range and azimuth of the known point with respect to the moving vehicle may be made and the vehicle's position computed by trignometric and navigational formula. Such computation, however, is neither simple nor quick of accomplishment so that by the time the computation has been performed and the results obtained, the position of the vehicle if fast moving, as an airplane, will have so changed as to make the effort all but useless.

It is a purpose of the instant invention to provide a system which, acting in conjunction with a navigational system of the type previously referred to and a radar system and display of the plan-position indicator type, will quickly and with very little manipulation correct for any errors that might have accumulated in the present position indicators.

More specifically the instant invention provides an apparatus whereby the known latitude and longitude of any recognizable object which is approached closely enough by the vehicle to provide a display on the plan-position indicator may be set into the instrument. The difference between this known latitude and longitude and the latitude and longitude as recorded on the present position indicating dials is taken and used to provide a display of azimuth and range on the plan-position indicator cathode ray tube. This display might be termed as electronic cross hairs which if the indicators of present position are correct will display the true range and azimuth from the vehicle to the recognizable object of known latitude and longitude and hence the display resulting from the radar return from this object will occur at the intersection of the electronic cross hair display.

On the other hand, if it should happen that the present position indicators are in error, the difference between the latitude and longitude as indicated thereby and the latitude and longitude of the recognizable object will depart from the true difference in latitude and longitude. The electronic cross hairs, however, will indicate the erroneous range and azimuth as derived from the erroneous differences in latitude and longitude while at the same time the radar return will display the object at its true range and azimuth. In other words, the radar display of the object will not occur at the intersection of the electronic cross hairs. That there is an error in the indicator readings of present latitude and present longitude is therefore readily apparent to the operator and steps may be taken to correct such error by changing the settings of present latitude and present longitude readings until the difference between these readings and the readings of latitude and longitude translated into range and azimuth indications of the electronic cross hairs coincides with the true range and azimuth as indicated by the radar return representation of the known and recognizable object. In other words, the readings of persent latitude and longitude are so changed, and through operation of the apparatus the positions of the electronic cross hairs changed, that the intersection of these cross hairs and the radar display of the known and recognizable object coincide. When this condition is reached, it is then known that the computed range and azimuth from vehicle to known object based on only one variable, namely, the present readings of latitude and longitude, agrees with the true range and azimuth and that therefore this setting of present latitude and longitude is correct.

One of the essential purposes of the instant invention is to provide a quick and efficient mechanism for resetting the indicators of present latitude and longitude if errors in their readings should be determined and to this end apparatus is incorporated which permits of such simultaneous movement or resetting of both the indicators of present latitude and longitude in such fashion that only one electronic cross hair is moved at a time and that in a known direction. By such apparatus, difficulties of operation, which would be inherent where only the latitude or longitude indicator were reset at one time resulting in simultaneous movement of the electronic cross hairs in not easily ascertainable directions, are avoided.

Additionally, the instant invention contemplates the provision of apparatus whereby simultaneous indications may be had from two different recognizable objects the latitudes and longitudes of which are known so that an even more accurate computation and reset of present latitude and longitude indicators may be made.

The invention will be more readily understood from the following detailed description, considered together with the attached drawings, in which.

Figure 1:
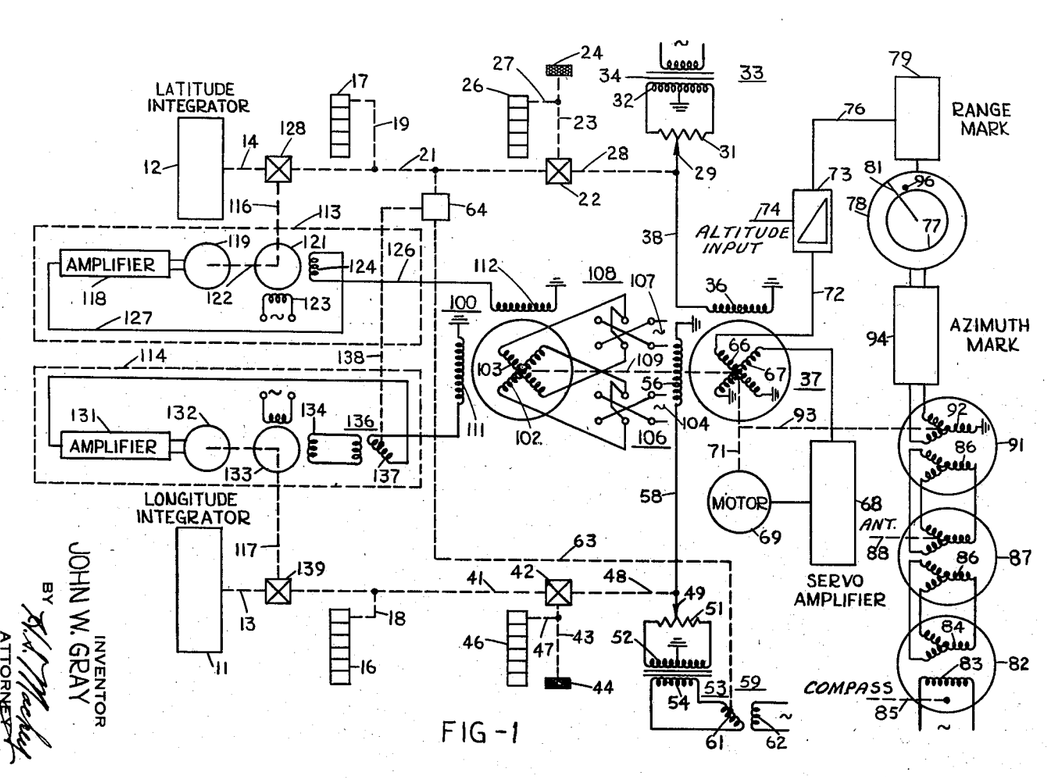
Figure 1 is a schematic diagram of one form of the invention in which electrical connections are generally indicated by solid lines and mechanical connections by dotted lines.

Referring now to Fig. 1 rectangles 11 and 12 designate apparatus for converting speed and direction of travel into shaft rotations which will continuously integrate changes in latitude and longitude respectively. The particular apparatus utilized to perform these related functions form no part of the instant invention but for the purposes of illustration and for completeness of description may be of the type as described and claimed in the copending application of Tull and Gillette, entitled "Navigation System," Serial No. 749,184 filed May 20, 1947.

Suffice it to say for the present purposes that the mechanism 11 continuously rotates a shaft 13 at a speed and in a direction depending on the change in longitude of the vehicle by which the apparatus is carried and likewise the mechanism 12 continuously rotates a shaft 14 at a speed and in a direction depending on the change in latitude of the vehicle by which the apparatus is carried. If then shafts 13 and 14 are made to communicate their movement to properly calibrated counters 16 and 17 through the medium of shafts 18 and 19, and these counters have been set to read the latitude and longitude at the starting point, then at each point in the journey the counters 16 and 17 will be so continuously changed as to at all times read the present latitude and longitude of the vehicle. So much of the apparatus together with the mechanisms which provide such continuous indications in latitude and longitude has been fully described in the Tull and Gillette copending application supra, and repetition here is unnecessary.

In any such system, however, that is, one which continuously integrates distance and direction of travel and displays the result as instantaneous latitude and longitude, some error is unavoidable. Such errors as there may be, even where quite small, are cumulative in effect. In other words, on a long trip even a 1 percent error would result in the counters 16 and 17 being in error by an appreciable amount and it is as an additional mechanism for periodically checking and correcting for any errors which may result which constitutes the basis for the present invention.

The shaft 19 connected to the counter 17 and the shaft 21 from which the shaft 19 receives its motion has at all times an angular position which is representative of the latitude reading on the dials of counter 17 whether this is the true reading of latitude or is in error by some amount for the reasons heretofore given. The shaft 21 and hence its angular position constitutes one of the inputs of a differential 22, the other input of which comprises the angular movement of the shaft 23 whose position is varied by the knob 24 and which likewise controls the setting of counter 26 through motion of a shaft 27. The counter 5 is similar to the counter 17, that is, it is calibrated in indicia of latitude and it may be manually actuated by the knob 24 and shaft 27 to read the known latitude of a cognizable object lying close enough to the path of travel of the vehicle so that a representation thereof will appear on the radar instrument carried by the vehicle. This rotation of the knob is also communicated to the shaft and hence the inputs of the differential 22 consist of angular movements corresponding to the latitude indicated the present latitude on the counter 17 (not necessarily correct present latitude) and the known latitude of the cognizable object. The output of the differential 22 communicated to shaft 28 through suitable gearing then constitutes the difference of angular positions of shafts 21 and 23 and represents the difference in latitude between present indicated latitude and known latitude of the recognizable object or distance thereto from the indicated position of the vehicle in a north-south direction.

This angular position of the shaft 28 representative of the vector difference in distance in a north-south direction is converted to a voltage representative of the same difference by connecting the shaft 28 to the movable contact 29 of a potentiometer 31 energized by the secondary 32 of a transformer 33 the primary 34 of which is connected to an alternating current source of potential. The secondary 32 is grounded at its midpoint so that actuation of the movable contact 29 throughout the range of the potentiometer will apply a varying potential to the movable contact 29 which is of one phase or of opposite phase depending on the position the contact 29 is made to assume on the potentiometer 31, zero difference in latitude, of course, producing a zero potential the potentiometer contact 29 being located at the midpoint under these conditions. The alternating voltage representative of the difference in the north-south direction is applied to one stator coil 36 of a two phase to two phase synchro constituting a resolver 37 through a conductor 38 the other end of the coil being connected to ground.

Turning now to the longitude indicia portion of the instrument a similar mechanism differing in some respects, is utilized to convert difference in indicated longitude position and known longitude of the recognizable object to obtain a voltage representative of the indicated distance in an east-west direction from the vehicle to the known object, thereby obtaining voltages representative of the position of the recognizable object with respect to the vehicle in rectangular coordinates.

As in the case of latitude indication, the shaft 41 connected to shaft 18 and in turn to counter 16 for indicating present longitude of the vehicle assumes an angular position which is representative of such indicated longitude and this angular position constitutes one of the inputs of a differential 42. The other input to this differential consists of the angular position of a shaft 43 operated by a knob 44 which also through a shaft 47 operates a counter 46 calibrated similarly to counter 16 to indicate longitude. If then the counter 46 is set by the knob 44 to read the known longitude, the angular position of shaft 43 will be representative of the longitude so set and the output of the differential obtained through suitable gearing will constitute a shaft position which is representative of the difference in indicated present longitude and known longitude of the recognizable object.

Difference in longitude, however, cannot be converted into a vector distance in east-west direction by simple algebraic subtraction by reason of the convergence of the lines of longitude at the earth's poles. Distance in an east-west direction depends not only on the difference in longitude but also on the latitude or position of the earth's surface with respect to the equator and the poles at which the difference is taken. Therefore, the angular position of the shaft 48 constituting the output of the differential 42 is not converted to a potential which is directly proportional thereto as was done in the case of converting latitude difference to a potential representative of distance in a north-south direction, but instead a further factor representative of the cosine of the latitude is introduced into the conversion. To this end the shaft 48 controls the position of a movable contact 49 on the potentiometer 51 the potential across which is varied as the cosine of the latitude. The potentiometer 51 is connected to a source of alternating current potential through a transformer 53, the secondary 52 of which is grounded at its midpoint and the primary 54 of which is connected to the movable coil 61 of a synchro 59 the stator 62 being connected to a source of alternating current. The position of the movable coil 61 is controlled by a shaft 63 which in turn is connected through suitable gearing 64 to the latitude shaft 21 in such a fashion that the shaft 63 is rotated one-half revolution for a change in latitude from pole to pole. The potential developed in the moving coil 61, therefore, is equal to the voltage applied to the stator coil 62 multiplied by the cosine of the latitude and hence this voltage applied to the potentiometer 51 through the transformer 53 incorporates the cosine correction necessary to convert difference in longitude into a vector distance in the east-west direction.

The potential representative of this vector distance may then be obtained from the movable contact 49 and applied to the stator coil 56 of the synchro 37 through conductor 58. There are, therefore, impressed on the respective stator coils 36 and 56 alternating voltages representative of rectangular coordinates of distance from indicated present position to known position of the recognizable object and these rectangular coordinates are converted to polar coordinates of both angle and vector sum of the rectangular coordinate position by the resolver action of the synchro 37. The movable coil 67 is connected so that the voltage induced therein constitutes the input of a servo amplifier 68 the output of which operates a motor 69 which in turn is connected by a shaft 71 to rotate the movable coils 66 and 67 of the synchro 37.

Any potential induced in the movable coil 67 is applied to the input of the servo amplifier 68, amplified thereby and the amplified output applied to the motor 69 causing it to rotate in one direction or another in a sense which so rotates coil 67 as to reduce the potential induced therein. This action continues until the coil 67 is rotated to its null position when no voltage is induced therein so that none is applied to the servo amplifier 68 and hence no output is available to energize the motor 69 so that it is stopped. At this null position the coil 67 and hence the shaft 71 has assumed an angular position representative of the vector angle of the vector sum of the voltages applied to stator coils 36 and 56. At the same time movable coil 66 movable with coil 67 but displaced 90 electrical degrees therefrom, is moved to such a position that the voltage induced therein is equal to the vector sum of the voltages impressed on coils 36 and 56. The voltages representing rectangular coordinates impressed on the stator coils of the synchro 37 are therefore converted to polar coordinates comprising a shaft position representative of angular direction from indicated present position to known position of the recognizable object and a voltage representative of the distance from indicated position to the object projected on a horizontal plane.

Where the apparatus is carried on an airplane, the distance as projected on a horizontal plane will not be the true distance from the vehicle to the known object but constitutes merely one leg of a right triangle the other of which is the altitude of the aircraft, the hypotenuse being the true or slant line distance from plane to object.

In order that a voltage be obtained that may be used to provide an indication of distance from plane to object and so provide an indication on the plan-position indicator a voltage representative of the altitude of the airplane must be vectorially added to the voltage obtained from the coil 66 to obtain the vector sum thereof. This is accomplished by impressing the voltage induced in coil 66 on one input 72 of a triangular solver 73 and a voltage representative of the altitude on the other input 74 thereof, the output obtained at the conductor 76 being equal to the vector sum of the input voltage and hence representative of the true or slant line distance from the indicated position of the plane to the known object.

The triangle solver 73 may be of any desired type which performs the desired function as for the purpose of illustration and not by way of limitation that disclosed and claimed in the co-pending application of Everett B. Hales, entitled "Triangle Solver," Serial No. 3652 filed January 21, 1948, now Patent Number 2,610,789, issued September 16, 1952, and assigned to the same assignee.

The voltage representative of the slant line distance between plane and recognizable object is utilized to provide a range mark 77 on the face of the plan-position indicator 78 through the action of a range mark mechanism indicated by the rectangle 79. Again the apparatus used to perform this function may be of any desired type, as one example only, that disclosed and claimed in the application of Clarke M. Gilbert, entitled "Pulse Generator," Serial No. 773,061, filed September 9, 1947, now Patent Number 2,555,440, issued May 29, 1951, and assigned to the same assignee. By the use of such a mechanism pulses are generated at a selected time interval after each radar transmission pulse and these pulses are applied to the intensifying electrode of the cathode ray tube constituting the plan-position indicator 78 to provide a circular range mark or electronic cross hair 77. Since the time of occurrence of the pulses relative to the time of radial sweep of the electron beam is made dependent through the action of the mechanism 79 on value of the voltage input thereto, the radius of the range mark 77 will be equal to the distance from indicated position to the known position of the recognizable object.

To form the other electronic cross hair 81 representative of the direction from the indicated position of the vehicle to the recognizable object a synchro system operated by the compass position, position of the radar antenna and position of the shaft 71 representing the angular direction from the vehicle to the object is utilized.

A synchro transmitter 82 has a single phase rotor 83 connected to be rotated by a compass shaft 85 and powered by a source of alternating current voltage. A three phase stator output 84 is in turn connected to a like three phase stator winding 86 of a synchro differential 87 which has a three phase rotor output rotated by a shaft 88 connected to the constantly rotating antenna of the radar plan-position indicator of the vehicle. The output of the synchro 87 is therefore a three phase output corresponding to the difference between the angles assumed by the compass shaft 85 and the constantly changing angle of the rotating antenna shaft 88. This voltage, representative of the difference between the heading of the vehicle and the instantaneous position of radar antenna, is impressed on the three phase stator 89 of a third synchro 91 the three phase rotor winding 92 of which is positioned by a shaft 93 connected to the shaft 71 so that shaft 93 assumes an angular position representative of the angle of the direction of the recognizable object as respects the north direction as calculated from the indicated position of the vehicle through the action of the resolver 37.

The output of synchro 91 obtained from the rotor 92 will therefore be an alternating voltage having an envelope whose amplitude varies as the difference between the angular position of shaft 93 and the difference output heretofore obtained between the heading of the vehicle and position of the radar antenna through action of synchros 82 and 87. A zero or null voltage output will be obtained from the synchro 91 when the angle assumed by the shaft 93, that is, the angle between north and the calculated direction to the recognizable object, is equal to the difference between the angle of the radar antenna as respects the heading of the vehicle and the angular heading of the vehicle as respects north.

Figure 5:
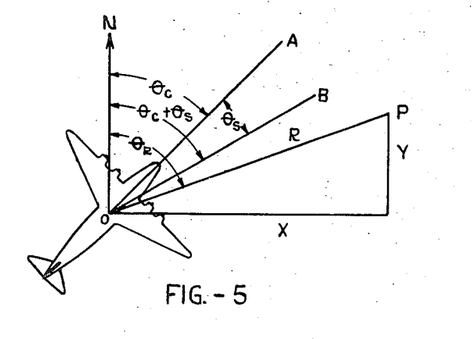
Figure 5 is a geometrical illustration of the angular relationships involved in the azimuth marking circuit.

These angular relationships can perhaps be better visualized by reference to the geometry of Fig. 5. In this figure the plane is at a point O heading in a direction OA at an angle $\theta_c$ as respects true north. The computed position of the target is that of point P, this position being computed from the difference in east-west directions and difference in north-south directions from the point O to point P indicated on the figure as distances X and Y and converted by the resolver 37 to the angle $\theta_R$, the bearing of the point P from the point O as respects true north. The direction angle of the radar antenna as respects the heading of the phase OA is constantly changing but for purposes of illustration it may be taken as instantaneously pointing in the direction OB at an angle $\theta_s$ as respects the heading of the plane. When the radar antenna has rotated to such an extent that the angle $\theta_c + \theta_s = \theta_R$ then it will be momentarily pointed in the direction OP or in other words directed in a line towards the computed position of the recognizable object. The synchro 82 has an output proportional to the angle $\theta_c$ which in synchro 87 is added to the shaft angle 88, namely, the angle $\theta_s$ and impressed on the input of the synchro 91 whose rotor operated by the shaft 93 is made to assume the angle $\theta_R$. When therefore the output of this synchro 91 is zero or a null the radar antenna is pointed in a direction which is indicated to be the direction from the plane towards the recognizable object based on the calculation of present plane position indicated dials 16 and 17. This null point may be utilized to provide the azimuth mark 81 on the face of the plan-position indicator 78 by means of an azimuth marking circuit 94 connected to the intensifying electrode of the plan-position indicator. Any suitable mechanism may be used for the azimuth marking circuit, as for example, and for purposes of illustration only a circuit such as described by Ridenour at pages 516 and 517 of Radar System Engineering, volume I of Massachusetts Institute of Technology, Radiation Laboratory Series, copyright 1947.

From the above it will be apparent that there is obtained and displayed on the face of the plan-position indicator, range and azimuth marks whose positions are equal to the range and azimuth of the recognizable object based on the position of the vehicle as indicated on the latitude and longitude dials 17 and 16. At the same time through the usual action of the plan-position indicator a radar display will be obtained which for example, indicates the position of the recognizable object to be at the position indicated at 96. This position is the true position of this object as respects the position of the vehicle and if such display occurs at the intersection of the electronic cross hairs comprising azimuth mark 81 and range mark 77, it is indicated that the calculated range and azimuth which was based upon the readings of latitude and longitude dials 17 and 16 is correct and that the readings of these dials is also correct. On the other hand, if as indicated in Fig. 1 the radar display of the recognizable object 96 does not occur at the intersection of the electronic cross hairs 77 and 81 an error in calculation of range and azimuth of the object with respect to the vehicle is revealed establishing that there is an error in the indicated present position of the vehicle, all other factors entering into this calculation being known and fixed. Therefore, the present position of the vehicle, that is, the readings of the latitude and longitude dials 17 and 16 must be changed to agree with what is the actual case and so that the range and azimuth electronic cross hairs do intersect at the point of radar display of the recognizable object 96.

Such correction might be made by merely rotating shafts 21 and 41 manually by slip clutch connections but such operation would be difficult and tedious of accomplishment for several reasons. Controlling either the latitude and longitude shafts or both together unless each is moved at certain rates proportional to the other, will move both the range and azimuth marks 77 and 81 at the same time and such direction of movement cannot be easily ascertained for the reason that in many cases the "up" direction on the plan-position indicator scope face 78 corresponds to the heading of the vehicle so that north may be in any radial direction around the face thereof.

Therefore, when latitude and longitude changes are made which are north-south and east-west changes, the operator would not know which way the intersection of the range and azimuth marks or the index point would move. This is made the more difficult because the pattern on a plan-position indicator is only traced once each revolution of the radar antenna so that response is not had immediately but the operator must needs make a change, wait to see if it was in the right direction and of sufficient amount.

To obviate these difficulties the instant invention incorporates a mechanism whereby only one of the marks is moved at a time and that in a direction clearly indicatable before any manipulation of controls is attempted.

To this end there is provided a resolver 101 consisting of a two phase to two phase synchro having rotor coils 102 and 103. Rotor coil 102 is connected to a source of alternating current potential indicated diagrammatically at 104 through a reversing switch 106 so that the potential applied to the coil 102 may be of one phase or of opposite phase depending on the direction of actuation of the switch 106. In a similar manner the coil 103 receives its potential from a source of alternating current 107 through a reversing switch 108 so that the potential applied to the coil 103 may be of one phase or of opposite phase depending on the direction of actuation of the switch 108. Additionally, rotor shaft 109 of the resolver 101 is connected to the rotor of the resolver 37 to be rotated thereby. By this means the rotor of resolver 101 carrying coils 102 and 103 is made to assume an angular position with respect to the stator coils 111 and 112 which is equivalent to the angle made by a line drawn from the indicated position of the vehicle to the known position of the recognizable object with respect to the north direction. When either of the switches 106 or 108 are closed there are then voltages induced in the stator coils 111 and 112 which are equal to the voltage of the source 104 or 107 as the case may be multiplied by the sine and cosine of the angle assumed by the shaft 109 and hence the rotor coils 102 and 103. If for example, the switch 108 which may be the range control switch is closed in either direction and the angle assumed by the shaft 109 is considered to be the angle $\theta$, a voltage will be induced in the stator coil 111 which has an amplitude equal to the amplitude of the potential source 107 multiplied by $\sin \theta$ while the voltage induced in the stator coil 112 will have an amplitude equal to that of the source 107 multiplied by $\cos \theta$, the phase of these potentials being of one phase or of opposite phase depending on the direction in which the switch 108 is actuated. If on the other hand, the switch 106 is actuated the situation is reversed since rotor coils are so wound that they depart from each other by 90 electrical degrees. In this instance the voltage induced in stator coil 111 will be proportional to $\cos \theta$ while that induced in coil 112 will be proportional to $\sin \theta$. The potentials induced into coils 111 and 112, therefore, always bear a relationship to each other as the sine and cosine of the angle $\theta$ the choice of which potential bears the relationship of the sine and which the cosine depending on which of the switches 106 or 108 are actuated. These sine and cosine relationships are used to selectively vary the simultaneous settings of indicated latitude and longitude so that depending on which switch is actuated only the range mark 77 or the azimuth mark 81 is controlled in its position on the face of the plan-position indicator 78.

Consider first the control of the position of the range mark which is moved in the desired position by the actuation of switch 108. As heretofore stated, closing of the switch 108 induces a voltage in stator coil 111 which is proportional to $\sin \theta$ while that induced in stator coil 112 is proportional to $\cos \theta$.

These two potentials constitute the input potentials for two rate servos indicated by the dotted rectangles 113 and 114 the outputs of which consist of velocities of rotation of the shafts 116 and 117 which are proportional to the amplitudes of the input voltages and the direction of which depend on whether the input voltages are of one phase or of opposite phase.

To obtain the result of a variable speed output dependent on voltage input any of the usual types of rate servo may be employed. For the purposes of completeness of description and not as a limitation, the rate servo such as 113, is here disclosed as consisting of an amplifier 118 the output of which is electrically connected to operate a motor 119 which in turn is mechanically connected to rotate an induction generator 121 by means of a shaft 122. One of the field windings 123 is connected to a source of alternating current while the other winding 124 is connected through the conductor 126 to the stator coil 112 of the resolver 101 and at its other end through the conductor 127 to the input of the amplifier 118. There is impressed on the field coil 124, therefore, the potential induced in the stator coil 112 and this potential is likewise impressed on the input of the amplifier 118.

Assume now initial conditions where no potential is induced in stator coil 112 and the motor 119, generator 121 and the shafts connected thereto are at rest. If now one or the other of the switches 106 or 108 is actuated in one or the other of their directions, a potential of some value will be induced in coil 112 and through field coil 124 will be impressed on the input of amplifier 118. This potential will in turn be amplified by the amplifier 118 and impressed on the motor 119 to cause it to revolve in one direction or another depending on whether the phase of the input potential is of one phase or an opposite phase. The rotation of the motor 119 causes an equal speed and direction of rotation of the generator 121 which in turn results in a potential being induced in the field coil 124 opposed to the potential derived from the stator coil 112, the coil 124 being connected in such fashion as to produce such opposition. For any value of potential induced in stator coil 112, therefore, the motor 119 and the generator 121 will be operated at such a fixed speed that the input to the amplifier consisting of the potential induced in stator coil 112 opposed by the voltage generated in field coil 124 at that speed is just sufficient to maintain that speed. For example, if the potential induced in coil 112 were reduced the difference between this induced voltage and the voltage generated by the generator 121 would become less or even reversed in sign thereby reducing the input to the amplifier 118 resulting in a reduction of speed in the motor 119 until a new steady state of balance between speed of rotation, that is, potential generated by the generator 121 and potential impressed on the system by stator coil 112 is reached. Conversely, it will be apparent, that an increase in potential induced in stator coil 112 will produce a steady state at a higher speed so that at all times the speed of rotation of the motor 119, the generator 121 and the shaft 116 connected thereto is directly dependent on the amplitude and sign of the potential induced in stator coil 112.

The input required for actuation of the amplifier 118 is relatively small so that at equilibrium the voltage of stator coil 112 is substantially equal to the voltage of field coil 124 and therefore the speed is proportional to the voltage of stator coil 112 even if the amplifier 118 is not linear.

The shaft 116 constitutes one input of a differential 128, the other input of which consists of the shaft 14 and the output of which comprises the shaft 21 connected to the shaft 19 which operate the latitude indicator 17. Any rotation of the shaft 116, therefore, will be added to or subtracted from the rotation of the shaft 14 to change the latitude indicator 17 in one direction or another to alter the reading thereof at a speed and by an amount equal to the speed and amount of rotation of the shaft 116. The potential induced in stator coil 112, therefore, varies the present indication of present latitude exhibited on counter 17 at a rate dependent on the amplitude of the induced potential and by an amount depending on the length of time such potential is induced. This variation in indication of present latitude, of course, varies the difference between such indicated latitude and the fixed latitude of the recognizable object which acting through shaft 28, resolver 37 and related circuits changes the positions of the azimuth mark 81 and range mark 77 on the face of the plan-position indicator 78 in the manner heretofore described.

The other stator coil 111 of the resolver 101 is used to change the present longitude reading in a manner similar to that just described with reference to the change of present latitude indication.

The rate servo 114 is similar in its major elements to the rate servo 113 consisting of an amplifier 131 the output of which is electrically connected to operate a motor 132 which in turn is mechanically connected to an induction generator 133. The single distinction resides in the fact that in the case of the rate servo 114 the potential generated in the field coil 134 is not directly opposed to the potential induced in stator coil 111 and the difference applied as the input of the amplifier 131 but a secant conversion factor is introduced because a voltage which corresponds to rate of change in an east-west direction must be converted to a rate of change longitude and the latter varies as the secant of east-west direction as a result of the convergence of the lines of longitude toward the poles.

This conversion is provided by introducing a resolver 136 between the field coil 134 and the circuit including the stator coil 111 and the input of the amplifier 131, the moving coil 137 of the resolver being rotated by a shaft 138. The shaft 138 is actuated by gears 64 in the same manner as shaft 63 so that the position of the moving coil 137 varies as the latitude of the vehicle. By this means the speed of the shaft 117 is made to depend on the product of the reciprocal of the cosine of latitude, i. e., secant thereof, and the potential of the field coil 111 converting what is representative of rate of change in an east-west direction to a rate of change of longitude at the present location of the vehicle.

This rate of change of longitude forms one input of a differential 139 whose output is connected through the shaft 41 to the shaft 18 which controls the setting of the present longitude indicator 16 and in turn the relative difference in present indicated longitude and longitude of the recognizable object present on indicator 46. This difference as described heretofore acts to position the electronic cross hairs or azimuth mark 81 and range mark 77 and any change in this difference will result in a movement of both marks.

In order that present latitude and longitude indications be changed while at one and the same time observing the criteria of changing the position of only one of the electronic cross hairs, either the azimuth mark 81 or range mark 77, both the longitude and latitude indicators of present position must be changed at mutually interdependent rates and this is the function of the resolver 101, rate servos 113 and 114 and their related apparatus above described, operating in the following manner:

Consider first the actuation of switch 108 which as will appear hereinafter, controls only the variation in position of the range mark 77. Assume first that the switch 108 is actuated in its downward position which for the purposes of this explanation is assumed to be such as will move the range mark 77 radially outward on the face of the plan-position indicator 78.

The actuation of this switch impresses a potential of one phase on the rotor coil 103 of the resolver 101 and this coil has been caused to assume an angular relationship $\theta$ with respect to the stator coils 111 and 112 by actuation of its shaft 109 by the resolver 37. The angle $\theta$ in this case being the angle included between the north direction and the direction from the indicated position of the vehicle to the position of the recognizable object.

Figures 2, 3, 4:
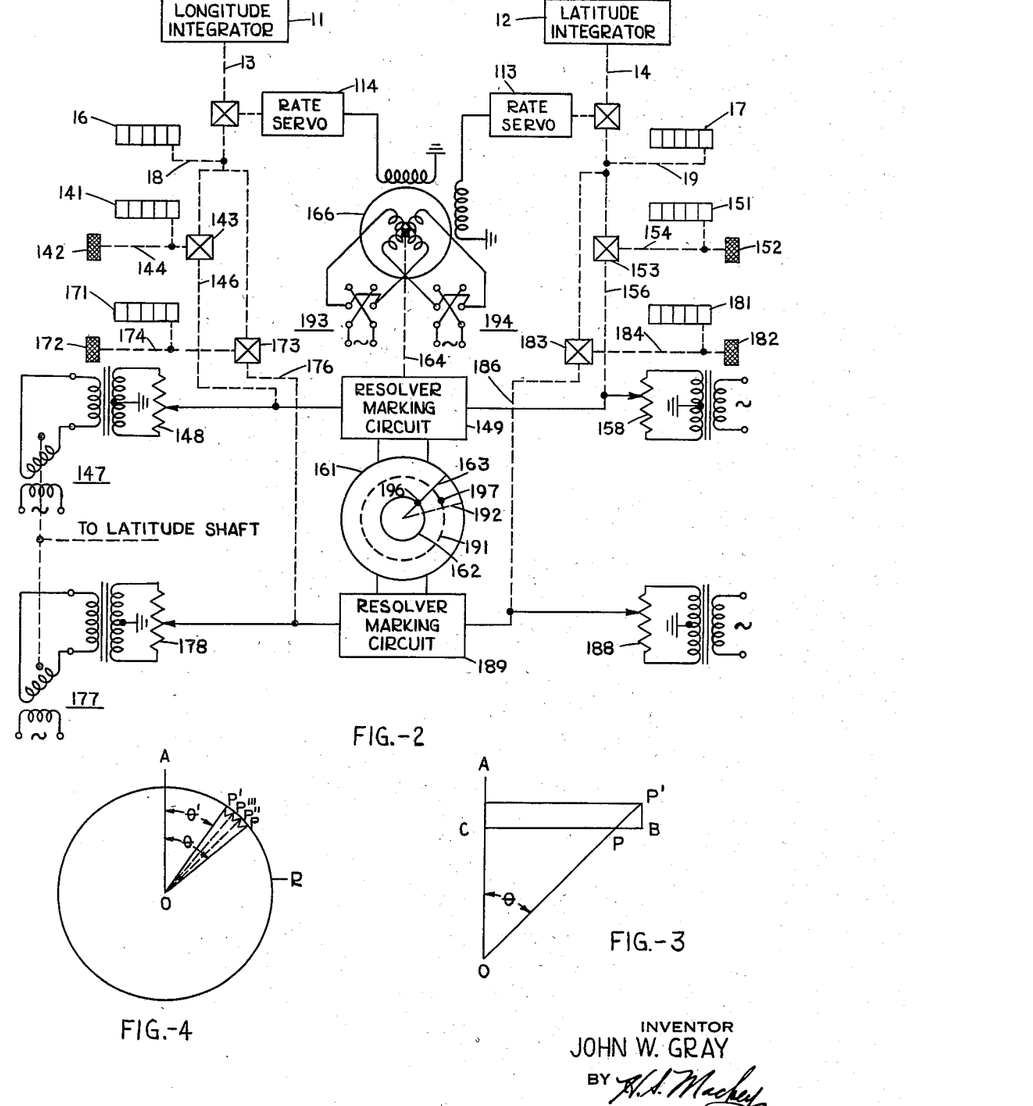
Figure 2 is a similar schematic diagram of a modified form of the invention.
Figure 3 is a geometrical illustration of the manner in which the range mark setting is varied without disturbing the azimuth mark display.
Figure 4 is a geometrical illustration of the manner in which the azimuth mark setting is varied without disturbing the range mark display.

For greater clarity of understanding, reference is made to Fig. 3 wherein O is taken as the present location of the ship, P as the location of the recognizable object, OA the direction of true north, OP the direction from vehicle to known object and the angle θ as the angle between these two directions and the angle assumed by the rotor of the resolver 101.

The position of the point P with respect to the point O may be determined in either one of two manners, either as polar coordinates as displayed on the face of the plan-position indicator as a distance OP at an angle θ with respect to north or in rectangular coordinates as the vector sum of the distance OC in a north-south direction and a distance PC in an east-west direction and changes in the point P may be made by changing either set of variables.

If the rectangular coordinates are to be changed as must be the case if the latitude and longitude present position settings are changed and if it is desired that the new position P' have the same azimuth, i. e., the angle between north direction OA and the line OP' remain the same angle θ, while varying only the range or length of the line OP' then the rectangular coordinates OC and CP must be added to by amounts and rates which bear a definite relationship to each other and the angle θ.

Specifically as can readily be seen from the geometry of Fig. 3 the rate of change of the added distance PB must vary as sin θ while the rate of change of the distance P'B must vary as cos θ, the added vector sum of these rates of change then constituting the distance PP' bearing the same azimuth as angle θ as respects north.

Recurring now to the resolver 101, it will be apparent that when the moving coil 103 has been made to assume the angle θ with respect to the stator coils 111 and 112 and when these coils are so wound as to depart from each other by 90 electrical degrees, then the voltage induced in stator coil 111 will bear a relation to the voltage in coil 103 which is sin θ, and the voltage induced in stator coil 112 bears a relation to the same voltage impressed on coil 103 which is cos θ.

Since the voltages induced in coils 111 and 112 bear this sine and cosine relationship to each other and since these voltages are translated into speed of setting of the longitude and latitude indicators 16 and 18 through action of the rate servos 114 and 113 respectively, it is apparent that the difference in indicated latitudes and longitudes and latitudes and longitudes of the recognizable object are varied in the same relationship and that this difference translated into the position of the range mark 77 will vary without changing the position of the azimuth mark 81 located at the angle θ as respects north.

In order that the range mark 77 be moved radially inwardly on the face of the plan-position indicator 78 it is only necessary that the phase of the voltage applied to the rotor coil 103 be reversed by operating the switch 108 in an upward direction so reversing the phase of the voltages applied to the coils 111 and 112 and thereby through action of the rate servos 113 and 114 performing a fixed relation subtracting operation to the latitude and longitude indicators.

To change the angular position of the azimuth mark 81 without changing the position of the range mark 77, the switch 106 is actuated impressing an alternating voltage from the source 104 on the rotor coil 102. As in the case of energization of the coil 103 voltages having a relationship as the sine and cosine of the angle θ are induced in stator coils 111 and 112 but since rotor coil 102 is so wound as to be 90 electrical degrees out of phase with coil 103 the relationship is reversed, that is, the voltage induced in coil 111 now has a relationship as the cosine of the angle θ while that in coil 112 has a relationship as the sine of the angle θ. Under such circumstances acting through the rate servos 113 and 114 one potential will add to the difference in latitude or longitude as the case may be while the other will subtract.

Assume for example, that the switch 106 is moved in its downward direction and that such actuation so phases the voltages in coils 111 and 112 that a subtractive operation is performed as respects distance in the east-west direction and an additive operation as performed as respects north-south direction always remembering of course, that a secant correction is exercised on the longitude changing mechanism so that rate of change in an east-west direction is converted to change in longitude at the latitude of the vehicle.

Such a process of change is indicated by the geometry of Fig. 4 where as before, O indicates the indicated position of the vehicle, P the position of the recognizable object, OA the direction of true north, OP the indicated direction to the object at an angle θ from true north and OP' the direction to the object after correction has been supplied at a new angle θ' as respects true north.

Bearing in mind that the potentials applied to the rate servos 113 and 114 through action of the resolver 101 are translated into rates of change it will be appreciated that east-west and north-south changes occur in small increments each of which under this operation vary the angle θ and so the respective rates of change in the two rectangular directions.

So considered, the distance in the east-west direction is varied so as to reduce this distance by unappreciable steps occurring at a rate proportional to the cosine of the always varying angle θ while distance in the north-south direction is increased by unappreciable steps occurring at a rate equal to the sine of the always varying angle θ.

In the geometric illustration of Fig. 4 these unappreciable steps have been magnified as positions P'', P''' and P' to more clearly indicate the action which occurs and it will be apparent that the vector corresponding to the direction and distance from indicated position to the position of the recognizable object follows the arc of a circle R changing its direction to a new angle θ' as respects north but not its length. This change translated through the computing action of the present invention means that the azimuth line 81 will move toward the left but that the range mark 77 will remain stationary.

In order that the azimuth mark 81 be moved to the right, it is only necessary that the switch 106 be reversed to reverse the phase relationships as discussed in connection with the variation in position of the range mark 77.

By the use of simple switching control, therefore, either the range mark or the azimuth mark may be moved separately while maintaining the other stationary and quicker and more accurate operation may be obtained.

If desired for example, the switches 106 and 108 may be combined into a single manipulative knob whereby a push or pull operation actuates the switch 108 in one or the other of its positions and a turning operation to the right or left actuates the switch 106 in one or the other operations. Such a combination would in itself provide a key to the direction of operation of the electronic cross hairs, the connections being made to be such that pushing the knob inwardly moves the range mark inwardly while pulling it out moves it outwardly and at the same time an actuation to the left moves the azimuth mark 81 to the left and actuation to the right produces a movement to the right.

In any event the range and azimuth marks may be moved in known directions so that their intersection is made to fall at the point of radar display of the recognizable object and the very act of such adjustment operates to reset the indicators of present latitude and longitude at the proper latitude and longitude with respect to known latitude and longitude of the recognizable object, namely, the actual present latitude and longitude of the vehicle as distinguished from one computed by operation of a navigational system which despite accuracy in design and construction, nevertheless introduces small errors which accumulating in long journeys may grow to appreciable proportions.

The system so far described enables an operator to obtain a fix on a single object and from that fix automatically correct the indicators of latitude and longitude to agree with what is actually the fact.

Radar indications of known and recognizable objects can be quite precise as far as range measurements are concerned, but some lack of definition occurs in the azimuth measurements for the reason that the radar beam width cause a point target to spread over a considerable angle on the plan-position indicator display. Likewise any compass error will be translated into an error in azimuth which when only a single object is used as in the system so far described give rise to some possibilities of slight errors in the settings of the latitude and longitude indicators.

To avoid even these small errors, therefore, under any conceivable conditions of operation, there is devised a second modified form of the apparatus which permits obtaining a fix on two different recognizable objects simultaneously.

Such a system is disclosed in Fig. 2 and for simplicity of showing as well as ease in understanding, certain elements shown in detail in the system of Fig. 1 have been combined and illustrated merely as rectangles in Fig. 2.

As in the case of Fig. 1 rectangles 11 and 12 represent the navigational system apparatus which acts to convert indications of speed and direction into continuous shaft rotations constituting integrators of longitude and latitude changes. These changes are recorded on counters 16 and 17 through the mechanical connections of shafts 13 and 18 and 14 and 19.

The longitude of one recognizable object may be set into the indicator 141 by the manual control 142 and at the same time the movement occasioned by such a setting is communicated as one input of a differential 143 by the shaft 144. The other input of the differential consists of the output of the longitude integrator 11 acting to rotate the counter 16 to an indication of present longitude so that the output of the differential communicated by shaft 146 constitutes the difference in present indicated longitude and longitude of the first recognizable object. This shaft rotation is converted to a voltage representative of difference in distance in an east-west direction in the same manner as described in connection with Fig. 1 using a resolver 147 the rotor of which is rotated in accordance with present latitude to introduce the necessary cosine factor for converting from differences in longitude to actual difference in distance regardless of the position on the earth's surface at which the vehicle may happen to be located.

The voltage representing this difference in east-west direction, obtained by actuation of a potentiometer 148 by the shaft 146 in the same manner as the mechanism of Fig. 1 constitutes one input of a resolver-marking system which may be identical with that described in detail in connection with Fig. 1 and, therefore, for purposes of simplification, here disclosed merely as the rectangle 149.

The latitude of the first recognizable object is set into an indicator 151 by a manual control 152 and the movement occasioned by such setting procedure communicated as one input of a differential 153 through a shaft 154. The other input of the differential 153 consists of the rotation of the shaft 14 positioned by the latitude integrator 12 to correspond to the present indicated latitude of the vehicle, so that the output of the differential 153 will constitute a shaft rotation representative of the difference in present indicated latitude and latitude of the first recognizable object or the distance from the indicated position of the vehicle to the first recognizable object in a north-south direction.

This shaft rotation applied to the shaft 156 is converted to an alternating voltage representative of the same difference in distance by the use of a potentiometer 158 controlled by the shaft 156 in the same manner as described in connection with Fig. 1. This voltage in turn constitutes the other input of the resolver-marking circuit 149 the output of which communicated to the plan-position indicator display 161 provides the range and azimuth marks 162 and 163.

The resolver-marking circuit 149 also provides a rotational mechanical output through the shaft 164 which is utilized to position the rotor of a resolver 166 used for producing mutually interdependent rates of adjustment of the present latitude and longitude settings in the same fashion as heretofore described in connection with Fig. 1.

In this instance the rate servos have been shown merely as rectangles 114 and 113 but they may be identical with the same elements referred to in connection with Fig. 1 and hence a more elaborate description would be merely repetitious and unnecessary.

In addition to the manual controls 142 and 152 for setting in longitude and latitude positions of the first recognizable object, the system of Fig. 2 provides additional controls 172 and 182 acting to provide indications of longitude and latitude on the counters 171 and 181 and also as inputs to differentials 173 and 183 through the mechanical connections of shafts 174 and 184. The other inputs of differentials 173 and 183 respectively consist of the rotations of shafts 13 and 14 so that the outputs thereof applied to the shafts 176 and 186 constitute rotations representative of the differences in longitude of present indicated position and longitude of the second recognizable object and latitude of present indicated position and latitude of the second recognizable object.

These shaft rotations representing differences in longitude and latitude are converted to voltages representing differences in east-west and north-south directions in the same manner as before by the use of potentiometers 178 and 188, the necessary cosine corrective factor for converting longitude difference into difference in distance in the east-west direction being introduced by the use of the resolver 177.

The two voltages representing the distance differences in the east-west and north-south directions constitute the two inputs of a resolver-marking circuit 189 which is similar to the circuit of the resolver-marker 149 and that described in some detail in connection with Fig. 1, except that no mechanical connection is provided between this circuit and the resolver 166. Additionally, and preferably, although not necessarily, a blocking oscillator or other form of interrupting device may be included in the marking circuit so that the range and azimuth marks 191 and 192 will appear as broken or dashed lines to distinguish them from the range and azimuth marks 162 and 163.

In operation switch 193 or switch 194 is actuated to operate through the circiut of resolver 166 and rate servos 113 and 114 to simultaneously adjust present latitude and longitude readings in a mutually interdependent manner such that only the range mark 162 or only the azimuth mark 163 are adjusted in a manner more specifically described heretofore.

Particular attention is paid to successively actuating switches 193 and 194 so that coincidence of the range mark 162, azimuth mark 163 and representation of the first recognizable object 196 is obtained. More precise setting of the range mark to coincide with the representation of the object 196 should be made than is necessary for the setting of the azimuth mark 163 since as heretofore stated, it is the angular relationship that suffers error due to lack of definition and compass error.

Having achieved this setting, attention is given over to obtaining coincidence between the range mark 191 and representation of the second recognizable object 197.

The rates of resetting the latitude and longitude indicators by action of the resolver 166 and rate servos 113 and 114 are controlled by and made proportional to the differences in east-west and north-south distances between the first recognizable object and the estimated position of the vehicle. If the range control switch 193 is actuated, the range marker 162 is varied without varying the position of the azimuth marker 163 and conversely the azimuth control switch 194 alters the position of the azimuth marker 163 without changing the position of the range mark 162. This is not the case however, as regards the azimuth and range markers 192 and 191 for the second recognizable object since the east-west and north-south difference distances are not the same and the mutually interdependent rates of variation of the latitude and longitude settings are not such as to control only one of the second range and azimuth markers. This is advantageous since now the second range marker 191 may be varied to coincide with the position of the second recognizable object by actuation of the azimuth control siwtch 194 while at the same time maintaining the position of the first range mark 162 constant.

In effect what is accomplished by this apparatus and its operation is to obtain proper fix to present vehicle position by using the more accurate range indications of two different points, utilizing the azimuth of one of them, if at all, for only the roughest setting. In fact the azimuth mark 192 for the second recognizable object need not be used at all and this mark and the apparatus for producing it eliminated if desired.

The use of the first azimuth mark 163 in fixing on the first recognizable object is desirable to facilitate the subsequent movement of range marker 191 in the right direction to place it on the second recognizable object. Since range mark 191 is controlled by the "azimuth" switch 194, it is not obvious which way this switch should be thrown to move the range mark 191 out or in unless the azimuth mark 163 has previously been placed approximately to correspond with the first recognizable object. However, it is quite possible to obtain the two-point fix even if both azimuth marks are omitted.

Figure 6:
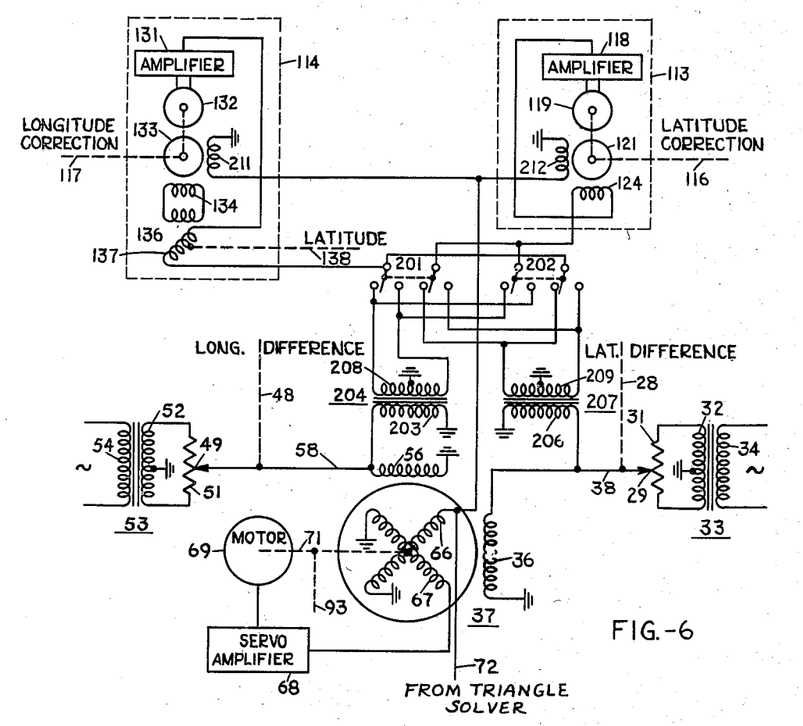
Figure 6 is a schematic diagram of modified portion of the invention.

In Fig. 6 a modified portion of the systems of Figs. 1 and 2 is shown in which the proper voltages for operating the rate servos are obtained directly from the stator coils of the marking circuit resolver without requiring the conversion by a second resolver such as 101 of Fig. 1 and 166 of Fig. 2.

In Fig. 6 only that portion of the system is illustrated which has immediate reference to the modified portions of the systems of Figs. 1 and 2 and where like parts and connections have been used like reference characters have been employed.

The longitude difference is obtained from the rotation of a shaft 48 in the same manner as in the systems previously described and this shaft rotation is converted to a voltage representative of distance in the east-west direction by the medium of a potentiometer 51 which has applied thereto an alternating potential having a cosine of latitude correction as heretofore discussed. The voltage so obtained is impressed on the stator coil 56 of the resolver 37 by means of the conductor 58. Similarly the latitude difference represented by the rotation of shaft 28 is converted to a voltage representative of distance in a north-south direction through the medium of the potentiometer 29 and this voltage is impressed on the stator coil 36 of the resolver 37 by lead 38.

The resolver 37 operates in the manner as previously described to provide range and azimuth indications for the marking circuits so that this portion of the system is not redescribed.

The system of Fig. 6 differs from those previously described in the manner of obtaining the voltages which operate the rate servos 113 and 114 which in turn introduce the latitude and longitude corrections into the system at such mutually interdependent rates as to alter the position of but one electronic cross hair at a time.

A second resolver for obtaining voltages to operate the rate servos is not used but instead these voltages are derived directly from the stator coils 36 and 56 of the resolver 37 and through the medium of the double pole double throw switches 201 and 202, these voltages having the proper mutual relation, are applied to respective coils of the generators 133 and 121. To this end, the primary 203 of transformer 204 is connected in parallel with stator coil 56 while the primary 206 of the transformer 207 is connected in parallel with stator coil 36.

The secondary 208, grounded at its midpoint, therefore as induced therein a voltage representative of the difference distance in an east-west direction. At the same time the secondary 209, also grounded at its midpoint, has induced therein a voltage representative of the difference distance in a north-south direction.

Double pole double throw switch 201 is so connected to the secondaries 208 and 209 so that when this switch is thrown to the right as illustrated in Fig. 6 a voltage of one phase proportional to the east-west difference voltage is applied to the rate servo 114 and a voltage of the same phase proportional to the north-south difference voltage is applied to the rate servo 113. On the other hand actuation of the switch 201 in the opposite direction applies the same voltages but of opposite phases to the respective rate servos.

This switch therefore acts as the range control switch as will be evidenced by considering the geometry of Fig. 3. Assuming as before that the indicated position of the recognizable object is at point P while the true location is at point P' it is desired to add the distance PB to the difference in east-west direction and the distance BP' to the difference in the north-south direction at rates which are related to each other as these distances are related. Triangles OCP and PBP' are similar and hence the distance P'B is similar to the distance OC, i. e., the north-south difference distance while the distance PB is similar to the distance CP the east-west difference distance.

The voltage applied to stator coil 56 and hence induced in secondary 208 is proportional to the distance CP and hence also PB while the voltage applied to stator coil 36 and hence induced in secondary 209 is proportional to the distance OC and hence also BP'. These voltages therefore when applied to rate servos 113 and 114 provide the proper rate of latitude and longitude change to provide correction of range only without change of azimuth.

To provide azimuth change without variation of range setting the switch 202 which acts to apply the voltage induced in secondary 209 in one sense or an opposite sense to the rate servo 114 and the voltage induced in secondary 208 in one sense or the opposite sense to the rate servo 113 is actuated. In other words, the switch 202 is interconnected so as to apply a voltage to the rate servo 113 which is representative of the east-west difference distance and to the rate servo 114 a voltage which is representative of the north-south difference distance giving an action as depicted by the diagram of Fig. 4.

This arrangement will provide the proper proportional and interdepenent rates of correction between the latitude and longitude but it will be apparent that the voltages which act on the rate servos to supply the rates of correction will vary in magnitudes as the difference in distance between airplane and recognizable object. In other words, a small difference in distance produces small though properly interrelated voltages and a large distance produces large though still properly related voltages.

If only these voltages were applied to the rate servos for correction purposes the introduction of the correction might be too rapid in some cases, i. e., where there was a large difference distance and too slow in others, i. e., a small difference distance. To prevent this disadvantage of different speeds of correction the coils 211 and 212 of the generators 133 and 121 receive their potential from that induced across the rotor coil 66 of the resolver 37, rather than from an independent supply as in the system of Fig. 1. The voltage induced in rotor coil 66 is proportional to the distance from the plane to the recognizable object so that this voltage varies by the same proportional amounts as do the voltages applied to coils 124 and 134, and since the speed of the rate servo is proportional to the quotient of the voltages impressed on each of the windings the speed of correction may be thus maintained within proper limits regardless of the variations in distance between plane and recognizable object.

While describing the systems herein disclosed, resolvers have been used to obtain sine and cosine voltage relationships, those skilled in the art will readily appreciate that other instrumentalities such as sine potentiometers may be used to produce the same results and that the systems disclosed are not necessarily limited to use of the exact components disclosed and described but that other equivalent instrumentalities may be used with equal efficacy.

What is claimed is:

1. A fix computer for a navigational system provided with indicators for continuously integrating and indicating present latitude and longitude on a moving vehicle, comprising, an indicator for indicating the latitude of a recognizable object contiguous to the path of travel of the vehicle, an indicator for indicating the longitude of said recognizable object, a cathode ray tube presenting on its screen a range and azimuthal display of a field of view including an image of said recognizable object, means operative conjointly by said present latitude and longitude indicators and the indicators of latitude and longitude of said recognizable object to provide range and azimuth markers on said cathode ray tube screen representative of the position of said object with respect to the indicated position of said vehicle and means for varying the position of said present latitude and longitude indicators at such mutually interdependent rates that the position of a selected one of said markers may be varied without altering the position of the other.

2. A fix computer for a navigational system provided with indicators for continuously integrating and indicating present latitude and longitude on a moving vehicle comprising, manually operable means for indicating the latitude of a recognizable object contiguous to the path of travel of the vehicle, manually operable means for indicating the longitude of said recognizable object, means for obtaining a mechanical movement proportional to the difference between the present indicated latitude and the latitude of said recognizable object, means for obtaining a mechanical movement proportional to the difference between the present indicated longitude and the longitude of said recognizable object, means for converting said mechanical movements into electrical energy representative of distances from the indicated vehicle position to the recognizable object in east-west and north-south directions, a cathode ray tube presenting on its screen a range and azimuthal display of a field of view including an image of said recognizable object, means utilizing the electrical energy representative of east-west and north-south distances from the indicated vehicle position to the known object to provide range and azimuth markers on said cathode ray tube screen representative of the computed position of said recognizable object and means for varying the position of the present latitude and longitude indicators at such mutually interdependent rates that the position of a selected one of said markers may be varied without altering the position of the other.

3. A fix computer for a navigational system provided with indicators for continuously integrating and indicating present latitude and longitude on a moving vehicle comprising, an indicator for indicating the latitude of a recognizable object contiguous to the path of travel of the vehicle, an indicator for indicating the longitude of said recognizable object, a first member positioned in accordance with the difference between the settings of said present latitude indicator and latitude indicator of said recognizable object, a second member positioned in accordance with the difference between the settings of said present longitude indicator and the longitude indicator of said recognizable object, means operable by said first member for producing a first voltage whose amplitude is proportional to the distance from the indicated position of the vehicle to the recognizable object in a north-south direction, means operable conjointly by said second member and said present latitude indicator for producing a second voltage whose amplitude is proportional to the distance from the indicated position of the vehicle to the recognizable object in an east-west direction, a cathode ray tube on said vehicle presenting on its screen a range and azimuthal display of a field of view including an image of said recognizable object, means for obtaining a third voltage from said first and second voltages whose amplitude is proportional to the vector sum of said first and second voltages, means including a range marking circuit operated by said third voltage for displaying a range mark on said cathode ray tube screen, means operative by said first and second voltages for positioning a shaft in accordance with the vector angle of said first and second voltages, means operative in accordance with said shaft position for displaying an azimuth mark on said cathode ray tube screen, and means for varying the position of the present latitude and longitude indicators at such mutually interdependent rates that the position of a selected one of said marks may be varied without altering the position of the other.

4. A fix computer in accordance with claim 3 in which said means for varying the position of the present latitude and longitude indicators at mutually interdependent rates includes a member positioned in accordance with said shaft position.

5. A fix computer in accordance with claim 3 in which said means for varying the position of the present latitude and longitude indicators at mutually interdependent rates includes a resolver having a pair of rotor coils and first and second stator coils, said pair of rotor coils being positioned in accordance with said shaft position, switch means for selectively and independently energizing said rotor coils from a source of alternating current, means operative by the voltage induced in said first stator coil when said switch means is actuated to variably position said present latitude indicator at a rate proportional to the amplitude of said voltage, and means operative by the voltage induced in said second stator coil when said switch means is actuated to variably position said present longitude indicator at a rate proportional to the amplitude of said second mentioned voltage.

6. A fix computer for a navigational system provided with a pair of indicators for continuously integrating and indicating coordinates of present position of a vehicle comprising a pair of indicators for indicating the known position of a recognizable object, means mutually operated by the present position indicators and the indicators of known position of the recognizable object for computing the coordinates of the position of the recognizable object with respect to the indicated position of the vehicle, a cathode ray tube presenting on its screen a display of a field of view including an indication of the actual position of the recognizable object with respect to the vehicle, means operative by said computing means for superimposing a pair of coordinate marks on said cathode ray tube screen indicating the computed position of the recognizable object with respect to the vehicle and means for simultaneously varying the indicators of present position of the vehicle at such rates relative to each other that only one of said pair of coordinate marks is varied in its position on said cathode ray tube screen at a time whereby said marks may successively be brought into coincidence with the indication of the actual position of said recognizable object and the indicators of present vehicle position are simultaneously altered so that the computed position of the recognizable object with respect to the vehicle agrees with the actual position with respect thereto.

7. A fix computer in accordance with claim 6 in which said means for simultaneously varying the indicators of present position of the vehicle includes a means for producing first and second voltages having amplitudes bearing a trigonometric relation with respect to each other and the computed direction of the known object from the vehicle and means for varying one of the indicators of present position at a rate proportional to the amplitude of said first voltage and means for varying the other of the indicators of present position at a rate proportional to the amplitude of said second voltage.

8. A fix computer for a navigational system provided with indicators for continuously integrating and indicating present latitude and longitude of a moving vehicle comprising an indicator for indicating the latitude of a first recognizable object contiguous to the path of travel of the vehicle, an indicator for indicating the longitude of said first recognizable object, an indicator for indicating the latitude of a second recognizable object contiguous to the path of travel of the vehicle, an indicator for indicating the longitude of said second recognizable object, a cathode ray tube presenting on its screen a range and azimuthal display of a field of view including images of said recognizable objects, means operative conjointly by said present latitude and longitude indicators and the indicators of latitude and longitude of said first recognizable object to provide first range and azimuth markers on said cathode ray tube screen representative of the position of said first recognizable object with respect to the indicated position of said vehicle, means operative conjointly by said present latitude and longitude indicators and the indicators of latitude and longitude of said second recognizable object to provide a second range mark on said cathode ray tube screen representing the distance of said second recognizable object from the indicated position of said vehicle and means for varying the position of said present latitude and longitude indicators at such mutually interdependent rates that the position of a selected one of said first markers may be varied without altering the position of the other and the position of said second range mark may be varied without altering the position of said first range mark.

References Cited in the file of this patent

UNITED STATES PATENTS

| | | |
|---|---|---|
| 2,408,773 | Goodall | Oct. 8, 1946 |
| 2,419,239 | White | Apr. 22, 1947 |
| 2,422,697 | Meacham | June 24, 1947 |
| 2,480,123 | Deloraine | Aug. 30, 1949 |
| 2,480,208 | Alvarez | Aug. 30, 1949 |